United States Patent [19]
Tuan

[11] Patent Number: 5,836,101
[45] Date of Patent: Nov. 17, 1998

[54] BRINE SHRIMP SEPARATION APPARATUS AND METHODS

[76] Inventor: Charles Tze-An Tuan, 2929 S. 450 East, Bountiful, Utah 84010

[21] Appl. No.: 740,431

[22] Filed: Oct. 29, 1996

[51] Int. Cl.$^6$ .................................................. A01K 79/00
[52] U.S. Cl. .............................. 43/4.5; 134/152; 134/170; 452/12; 43/6.5
[58] Field of Search .................................. 134/148, 152, 134/153, 170; 99/516, 526, 534, 535, 536; 43/4, 4.5, 6.5

[56] References Cited

U.S. PATENT DOCUMENTS

| | | | |
|---|---|---|---|
| 790,909 | 5/1905 | McCann | 99/536 |
| 2,020,645 | 11/1935 | Hook | 99/536 |
| 2,823,414 | 2/1958 | Seal | 452/12 |
| 3,487,840 | 1/1970 | Stenzel | 134/148 |
| 4,739,782 | 4/1988 | Nourie | 134/153 |
| 4,998,369 | 3/1991 | Lamon | 43/6.5 |
| 5,457,908 | 10/1995 | Sanders | 43/6.5 |

*Primary Examiner*—Jack W. Lavinder
*Attorney, Agent, or Firm*—Trask, Britt & Rossa

[57] ABSTRACT

An apparatus and method for harvesting brine shrimp from an aquatic environment includes a separator having a containment vessel having a perforated sidewall and a drive assembly for agitating the containment vessel, preferably in a rotational motion about a horizontal axis. A first liquid spray assembly positioned outside of the containment vessel is disposed to direct a spray of liquid over a portion of the exterior of the containment vessel to dislodge shrimp which may be lodged in the perforations of the containment vessel. A second liquid spray assembly, positioned within the hollow interior of the containment vessel, is positioned to drive shrimp eggs contained in the vessel outward through the perforations of the vessel sidewall.

7 Claims, 7 Drawing Sheets

BRINE SHRIMP SEPARATION APPARATUS AND METHODS

BACKGROUND OF THE INVENTION

1. Field of the Invention

This invention relates to structures and methods adapted for harvesting brine shrimp from aquatic environments. More specifically, this invention is directed to a method and apparatus for retrieving shrimp and their eggs from a water environment and thereafter separating the shrimp from the eggs.

2. State of the Art

Brine shrimp eggs have recently become a source of significant commercial interest. Once harvested, the eggs may be washed, dried and vacuumed packed and thereafter stored for a considerable length of time prior to their being subsequently hatched by reintroduction into a salt water environment at a temperature between 80° and 85° F. When hatched, the brine shrimp may be used as a food source for larger fish. Such eggs have become a principal source of nutrients for commercial fish farms, as well as small aquariums. With the increased commercial interest in brine shrimp as a commercial feed source, there has been a concomitant increase in the development of harvesting apparatus and methods directed towards the efficient harvesting of the brine shrimp eggs from aquatic environments, especially salt water lakes. Representation of such apparatus and methods are disclosed in U.S. Pat. No. 5,042,187 (Bentzley), U.S. Pat. No. 1,486,485 (Frissell), U.S. Pat. No. 4,839,062 (Sanders), U.S. Pat. No. 3,768,193 (London), U.S. Pat. No. 5,457,908 (Sanders), and U.S. Pat. No. 4,998,369 (Lamon).

The physical nature of brine shrimp eggs introduces a number of significant difficulties to the potential harvester of such eggs. The eggs are very small, oftentimes 7 million eggs being contained in an ounce. Due to the extremely small physical nature of the eggs, removing them from a body of salt water is quite difficult. A further concern is that the eggs tend to be found in association with shrimp. The interest of the commercial shrimp harvester is directed towards recovering the eggs as opposed to the shrimp which may be in the environs of the eggs. Under current commercial harvesting practices, the shrimp and the associated eggs are simultaneously removed from the aquatic environment and thereafter transported to a processing plant on land. At the plant, the shrimp are physically separated from the eggs. The shrimp are then discarded as a waste product. It is common practice to place the discarded shrimp on the ground to decay. This practice leads to several negative results. First of all, although brine shrimp tend to reproduce at a fairly high rate, nevertheless, recently there has been a noticed decline in the quantity of shrimp eggs which have been made available for harvest in such environments as the Great Salt Lake in Utah. It has been hypothesized that the population of shrimp has been declining, thereby leading to a reduced rate in the production of eggs. It follows that egg harvesting practices which also remove shrimp from their native environment may be contributing to the decline of the egg populations by destroying the shrimp population in such environments. Understandably, during the harvesting process when the shrimp are removed from the body of water and are later destroyed during the separation process, the ability of those shrimp to subsequently produce eggs has been lost. During the conventional practice of discarding the separated shrimp, the shrimp are typically deposited in landfills or merely spread over a section of land. As the shrimp decay, they tend to produce a very offensive odor. This odor oftentimes complicates the siting of the disposition sites for such shrimp.

There continues to be a need for a shrimp egg harvesting method and apparatus which at once provides for effective shrimp egg harvesting while simultaneously alleviating the problem of decreased shrimp populations which occur under conventional harvesting techniques.

Other problems have been encountered during the actual separation process of the shrimp from the eggs. One notable problem is the tendency of the shrimp, being physically larger than their accompanying eggs, to clog the openings in the separators which are traditionally utilized. Separation is typically done by using a horizontally oriented sieve or screen which is agitated back and forth in a horizontal plane. It should be recognized that the harvesting process is oftentimes fairly laborious as well as time consuming.

Various separation processes have been contemplated in other commercial separation activities. For example, U.S. Pat. No. 5,161,694 (Yoon et al.) describes an apparatus and method for selectively separating agglomerating coal in aquatic environment. Similarly, U.S. Pat. No. 4,236,999 (Burgess et al.) discloses an apparatus for separation which includes a hollow drum which is rotatably mounted. In yet another Burgess patent, namely U.S. Pat. No. 5,078,903, a modified drum assembly having a finely apertured rotatable screening drum is utilized. Other separators are disclosed in U.S. Pat. No. 4,689,143 (Fisher), U.S. Pat. No. 4,282,256 (Evich et al.), U.S. Pat. No. 4,223,688 (Nylund et al.), U.S. Pat. No. 3,603,643 (Hirota et al.), U.S. Pat. No. 5,500,114 (Potter et al.), U.S. Pat. No. 4,177,722 (van Olphen), U.S. Pat. No. 5,524,769 (Spencer), U.S. Pat. No. 4,435,917 (Lee) and U.S. Pat. No. 4,447,324 (Jackson).

Although the above-identified patents have been directed towards methods and apparatus for selectively removing one or more components from a slurry, none of the aforesaid patents appear to be specifically directed towards solving the difficulties encountered in separating brine shrimp eggs from their accompanying shrimp populations. Furthermore, none of the above-referenced patents appear directed to the difficulties encountered in such separation processes utilizing mesh or other similarly perforated structures whereby the shrimp, owing to their much larger size, tend to clog any openings or perforations in the screen device, thereby precluding the effective operation of such a device. It follows that there continues to be a need for apparatus and methods directed to effectively separate shrimp from their eggs efficiently.

SUMMARY

An apparatus and method for effectively separating shrimp from their accompanying brine shrimp eggs is disclosed. The apparatus includes a hollow container having a perforated sidewall which is mounted for displacement. In a preferred construction the container is adapted for being rotated, and in some embodiments the container may be rotated about a horizontal axis. The sizing of the perforations is selected to permit the brine shrimp eggs to pass through the perforations while precluding the passage therethrough of shrimp which may accompany the brine shrimp eggs. The shrimp are thus retained within the container while the eggs pass through the sidewall of the container. A receiving trough or tray is positioned beneath the container and is adapted to receive the brine shrimp eggs which pass through the perforations of the container. One or more pressurized liquid sprayer assemblies are positioned outside of the container and are oriented to direct a spray of pressurized liquid over the exterior surface of the container. The pressurized liquid sprayer, in preferred configurations, is positioned above the container and is oriented to apply a flow of liquid on the upper surface of the container. In yet a further preferred embodiment, a second source of pressurized liquid is positioned within the container itself and is oriented to direct a flow of liquid over the contents of the container. In this latter preferred embodiment, the liquid is directed preferably over the lower regions of the container and preferably towards a region which is elevationally below a horizontal plane which passes through the center of the container.

The perforated container contains an inlet configured to receive a flow of brine shrimp, shrimp eggs and a liquid medium, e.g. water or brine. The perforated container similarly includes an egress port which is configured to receive and remove the shrimp which have been separated from the brine shrimp eggs.

A driving means, which may be a motor in association with a drive assembly, may be associated with the perforated container. Upon actuation of the driving means the containment vessel is displaced or agitated, preferably in a rotational direction about an axis, by the drive assembly.

Under the instant method, a separator having a hollow container having a perforated sidewall is provided. The container is adapted for displacement, preferably rotation about an axis. A mixture of brine, shrimp and shrimp eggs is introduced into the hollow interior of the container. The perforations in the container sidewall are sized to permit the passage therethrough of shrimp eggs while precluding the passage therethrough of shrimp. The container is displaced, e.g., rotated, while a portion of the exterior sidewall of the container is sprayed with a liquid by a first spray assembly positioned outside of the container. In some constructions, the contents of the container are sprayed with a liquid by a second spray assembly positioned within the container. Shrimp eggs are urged through the perforated sidewall of the container by the action of the second spray assembly while shrimp lodged in the perforations of the sidewall are dislodged from the perforations and driven into the interior of the container by the action of the first spray assembly. Shrimp eggs passing through the perforations are collected by structure positioned beneath the container, while shrimp collected within the container are subsequently removed from the container for further processing, e.g., return to their native environment. The method may also include the step of collecting a slurry formed of brine shrimp, eggs and brine from an aquatic environment and directing the slurry to the aforesaid separator. Furthermore, the method may also include the step of withdrawing the shrimp from the separator and returning them to their aquatic environment and, furthermore, collecting the eggs from their collection structure and diverting them to a storage container.

The instant separator may be used either on shore or aboard a vessel. In one construction, the separator is positioned on a vessel, e.g., a boat, in association with a harvester for removing, e.g., lifting, a quantity of brine shrimp, shrimp eggs and water from an aquatic environment. In this particular configuration, the separator is adapted to receive the shrimp, brine shrimp eggs, and water directly from the harvester and thereafter separate the shrimp from the brine shrimp eggs and the salt water. Once separated, the shrimp are then returned to their aquatic environment, preferably with a significant portion of the shrimp still remaining alive. The brine shrimp are removed from the container by the action of a diaphragm pump and thereafter reintroduced back into the aquatic environment through a piping arrangement. It follows that in contrast to previous separation methods, the instant method permits the shrimp to be separated from their eggs and thereafter reintroduced into the aquatic environment alive where they thereafter can continue to produce brine shrimp eggs and thereby continue as a source of egg production. The instant method and apparatus is therefore significantly more environmentally friendly than previous methods hereto practiced. The brine shrimp eggs and their associated brine are removed from the receiving trough positioned beneath the perforated container and are thereafter directed through a piping arrangement under pressure to a perforated container or sack. The perforations in the sack permit a significant quantity of the brine or water to be drained from the brine shrimp eggs. The containers are thereafter taken to shore where further processing is pursued.

DETAILED DESCRIPTION OF THE ILLUSTRATED EMBODIMENT

Figure 1:
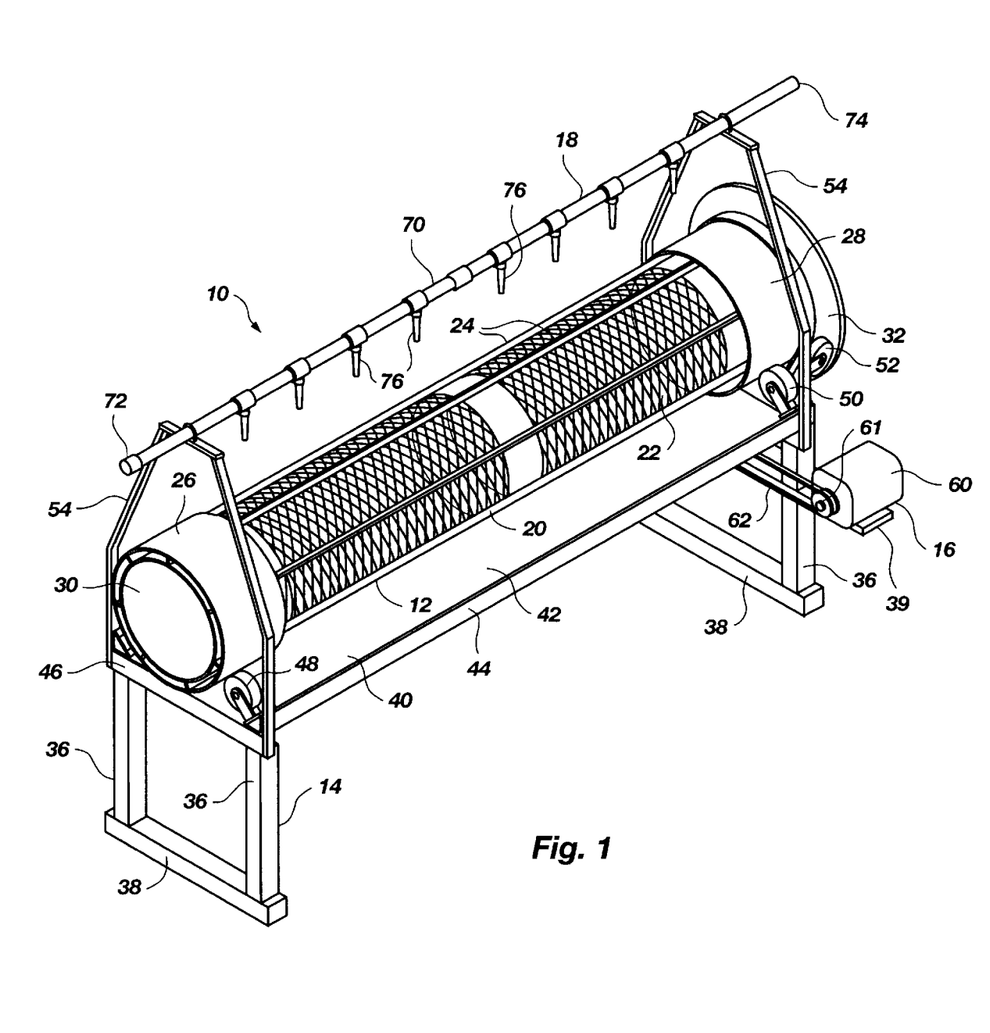
FIG. 1 is an elevated perspective view of a separator of the instant invention.

As shown in FIG. 1, a separator 10 of the instant invention includes a perforated containment vessel 12 which is rotatably mounted on a frame assembly 14. The frame assembly 14 includes a drive assembly 16 adapted for rotating the containment vessel 12 about a horizontal axis 17. A pressurized liquid spray assembly, e.g., water 18, is shown associated with the frame 14 and positioned elevationally above the containment vessel 12 for the purposes of directing a flow of pressurized liquid over the exterior surface of the containment vessel 12. In preferred constructions, the spray assembly is configured to direct a spray of water over that region of the containment vessel 12 which is elevationally above horizontal plane 79. The containment vessel 12 includes a structural framework having a plurality of longitudinally extending frame members 24 which are spacedly positioned about the generally circular perimeter of the containment vessel 12. The frame members 24 extend between a first annular end structure 26 and a second annular end structure 28. The frame members 24 support a mesh sidewall 22 which is positioned to the interior side of the frame members 24. The mesh may be fabricated of metal or other material. Preferably, the mesh is manufactured from a material which is resistant to corrosion in a salt water environment. In a preferred construction, this mesh 22 is sized between 10 mesh and 40 mesh; in a most preferred configuration, 40 mesh. The mesh 22 is attached to the end structures 26 and 28 and forms the complete, generally circular perimeter of the containment vessel 12. The containment vessel 12 defines a hollow interior 30 which is accessed through a first inlet 31 and is exited through an exit or egress port 33. In a preferred construction, the containment vessel 12 has a diameter of 18 inches and an overall length of 122 inches.

The end structures 26 and 28 are typically formed of a generally rigid metallic material of sufficient strength to support containment vessel 12 and furthermore to provide a support for the containment vessel 12 on the support rollers 48 and 50. Mounted on end structure 28 is a generally circular configured flange 32 which extends outwardly from the surface of the end piece 28.

The containment vessel 12 is supported by a frame assembly 14 which is formed by a plurality of upstanding frame members 36. Each pair of frame members 36 in association forms a foot assembly for the frame. The upper surface of each of the support legs 36 is mechanically associated with a frame assembly 46 which has a generally rectangular configuration and sits atop the plurality of upstanding legs 36. Positioned within the frame 46 is a trough 42, which is shown to advantage in FIG. 2.

As shown in both FIGS. 1 and 2, the trough 42 is positioned directly below containment vessel 12 and is ideally situated to receive and contain brine shrimp eggs and brine which exits through the mesh 22 which forms the perforated sidewall of the containment vessel 12. Furthermore, the bottom or floor of the trough 42 is fitted with an exit port 47 which is interconnected to an egress pipe 122.

The frame 14 is fitted with a number of support rollers 48 and 50. Each of these support rollers includes a upstanding frame having a roller rotatably mounted within that frame. Each of the rollers contacts an end structure of the containment vessel 12 thereby supporting that containment vessel 12 above the trough 42. As shown in the illustrated drawings, a pair of roller assemblies 50 is positioned to abut against end structure 28. Similarly, a pair of roller assemblies 48 is positioned to abut against the end structure 26. Furthermore, a further pair of roller assemblies 52 is mounted on an upstanding frame 54 of the support frame 14. Similar in construction to roller assemblies 48 and 50, this additional pair of roller assemblies 52 is positioned to abut on a common surface of the flange 32. As shown in FIGS. 1, 2 and 3, the frame assembly 14 furthermore includes an upstanding pair of frame elements 54, which extend outwardly and upwardly to largely circumscribe the perimeter of the containment vessel 12.

Figure 2:
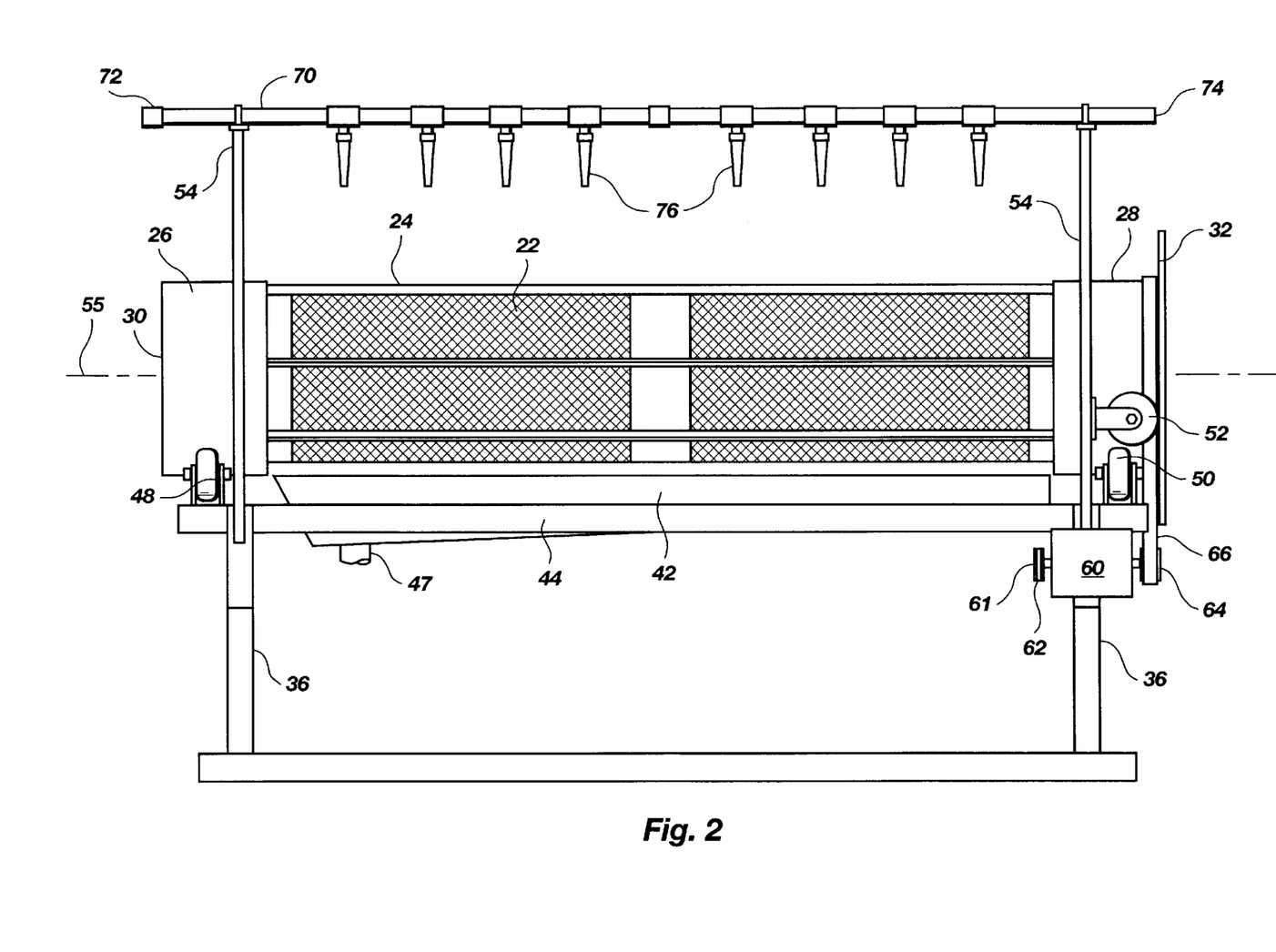
FIG. 2 is a side view of the separator of FIG. 1.
Figure 3:
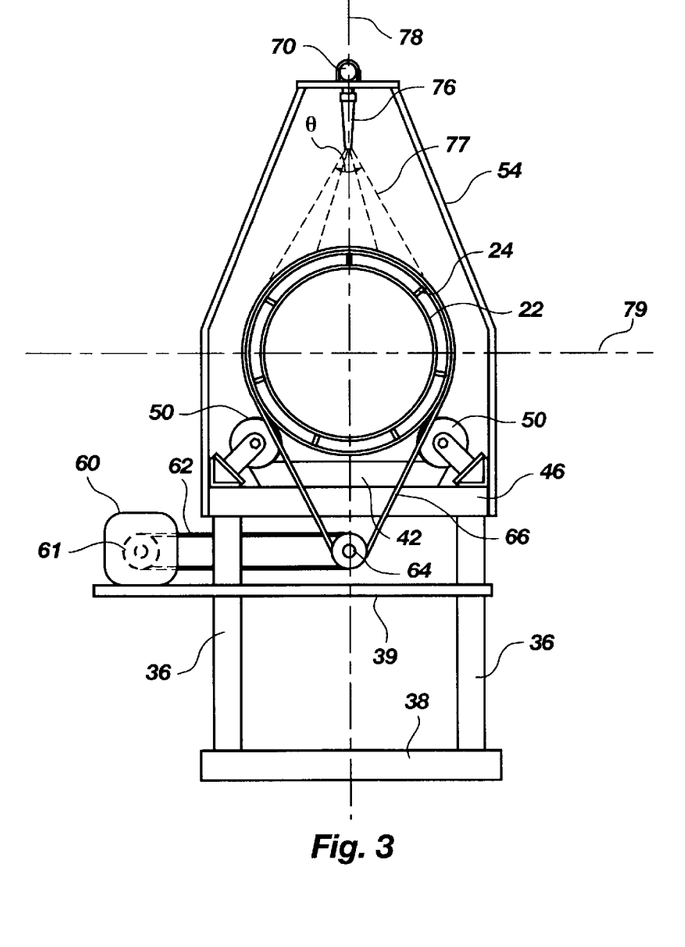
FIG. 3 is an end view of the separator of FIG. 1.

As shown in FIG. 2, the containment vessel 12 is oriented parallel to a horizontal axis 55. The bottom of though 42 is inclined relative to the axis 55. in order to expedite the processing, i.e., separation of brine shrimp eggs, the orientation of the containment vessel may be adjusted. To expedite processing the end 26 of the vessel is lowered relative to end 28 by adjusting the height of the roller supports 48 to slow the processing then end 26 is elevated relative to end 28.

Positioned atop the frame extensions 54 is the liquid spray assembly 18. The frame assembly 14 furthermore includes a laterally-extending shelf 39 which is positioned and mounted on a pair of the upwardly-extending legs 36 proximate the end support 28 of the containment vessel 12. Mounted on the shelf 39 is a motor 60 of the drive means. In a preferred construction, motor 60 is a four-horsepower motor having a rotational operational speed of 1800 to 3500 rpms. The motor 60 is fitted on its shaft with a pulley 61, which in turn engages a drive belt 62 which is positioned about the perimeter of the drive pulley 61. Drive belt 62 in turn is positioned about a second drive pulley 64 which is positioned generally centrally of the frame assembly 14. The drive pulley 64 includes a first pulley about which the drive belt 62 is positioned, a laterally extending, rotatably mounted drive shaft and a second pulley positioned about its opposing end. The drive pulley 64 is rotatably supported from the frame 14 by a mounting 62 assembly. A drive belt 66 is trained about the opposing drive pulley of the drive assembly 64 and is furthermore trained about the perimeter of the end structure 28 of the containment vessel 12. In alternative constructions, a gear box having a 17/41 drive ratio may be used in association with the motor to further control the rotational speed of the containment vessel 12. The motor 60 causes the pulley 61 to rotate, thereby effecting a rotation of the drive belt 62, which in turn causes the rotation of the drive pulley 64. This in turn causes a rotation of the containment vessel 12 due to the interaction of the drive belt 66 about the perimeter of the end structure 28 of the containment vessel 12.

The liquid spray assembly 18 may include a longitudinally-extending pipe 70 which has a plurality of nozzles 76 positioned spacedly along its length. The proximal end 72 of the pipe 70 is fitted with an end cap to seal that end whereas the distal end 74 is interconnected to a source of pressurized liquid, e.g., brine or water. Each of the nozzles 76 is positioned preferably in the vertical plane 78 which passes through the center of the containment vessel 12 as shown in FIG. 3.

In preferred constructions, the nozzles 76 are directed downwardly toward the exterior surface of the containment vessel 12 to thereby apply a spray of pressurized liquid to the exterior of the vessel generally in the pattern shown at 77, i.e., the nozzles 76 are positioned at the twelve o'clock position relative to the perimeter of the containment vessel 12. The angle of the spray theta ($\Theta$) as shown in FIG. 3 is preferably 90°. In some constructions, the spray pattern 77 is oriented to apply a flow of liquid over the perimeter of the containment vessel 12 which reaches from the intersection of a horizontal plane 79 which passes through the center of the containment vessel 12 from point A to point B, as shown in FIG. 3. The pressure and quantity of fluid directed through the nozzle 76 onto the exterior surface of the containment vessel 12 is adjusted to provide a means whereby shrimp which may be clogging the apertures or perforations in mesh 22 of the containment vessel 12 are pushed inwardly towards the center of the containment vessel 12, thereby freeing the apertures for the passage therethrough of brine shrimp eggs which may be contained within the interior 30 of the containment vessel 12. Spray nozzles 76 therefore serve as a means of unclogging the mesh 22 of the containment vessel 12 and thereby providing for the continued operation of the separator.

Figure 4:
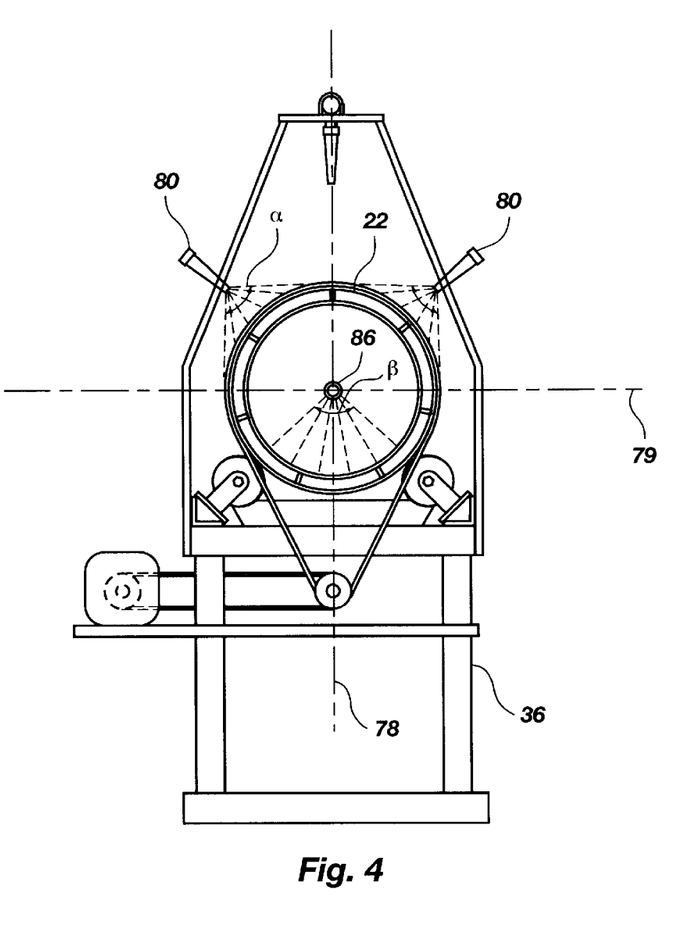
FIG. 4 is an end view of an alternative separator configuration wherein the arrangement of the pressurized spray assemblies has been rearranged and furthermore wherein a pressurized water spray assembly has been introduced into the interior of the containment vessel.

In an alternative construction, shown in FIG. 4, a pair of spray assemblies 80A and 80B, having nozzles 81 with their associated piping and water supply systems (not shown), is shown fitted to the frame 54. In this particular construction, the invention contemplates the positioning of a number of water nozzles at various locations about the perimeter of the containment vessel 12. Two additional sets of spray assemblies 80A and 80B have been added to the frame assembly at positions generally 45° from the horizontal axis 79 which passes through the center of the containment vessel 12. It should be understood that the two sets of water nozzles 80 could be used in substitution for the plurality of water nozzles 76 which are positioned directly above the containment vessel or alternatively, the two sets of water nozzles 80 could be used in conjunction with the set of water nozzles 76.

The principal focus of the invention is to position a source of pressurized water spray which directs that spray over at least a significant portion of the exterior perimeter of the containment vessel 12 when that perimeter is positioned above the horizontal plane 79. Furthermore, the invention may also include positioning nozzles to direct a flow of fluid on that portion of the containment vessel 12 positioned below the horizontal plane 79, but it is recognized that in preferred constructions the placement of the nozzles to apply a directed spray above that plane is considered to be operationally superior.

FIG. 4 illustrates the placement of a pressurized spray assembly 86 within the hollow interior 30 of the containment vessel 12. In the illustrated configuration, the nozzle of the spray assembly 86 is shown directing a flow or spray of liquid on the interior surface of the containment vessel 12 at an angle beta ($\beta$). In preferred constructions, $\beta$ is approximately 90°. Water nozzle assembly 86, which is similar in construction to the water assembly 18, is adapted for directing a spray of pressurized fluid on the contents of the containment vessel 12 and thereby assisting in directing the brine shrimp within the vessel outwardly through the perforations of the mesh 22. Various orientations of the spray nozzle assembly are contemplated with the flow pattern and direction of those flow patterns being subject to the specific contents of the containment vessel. In a preferred construction, the spray is directed radially from the center of the cross sectional area of the containment vessel 12 and hence the spray is radially directed from the centerpoint of the cross sectional area. The flow of liquid therefrom is substantially orthogonal to the perimeter of the containment vessel. While the illustrated embodiment depicts a preferred flow pattern which is positioned below the horizontal plane 79, it should be understood that in other constructions the flow pattern could be directed above that horizontal plane and substantially over a portion, if not the entire, perimeter of the interior circumference of the containment vessel 12. The function of the second set of nozzles 86 is directed towards displacing the brine shrimp eggs outwardly through the openings or perforations in the mesh 22, thereby depositing the shrimp eggs and any associated carrier medium into the trough 42.

It follows that in the instant invention, a first supply of pressurized liquid is directed over a portion of the exterior of the containment vessel 12 with the objective of displacing shrimp which may be caught in the perforations or openings of the mesh 22 and directing those shrimp toward the interior of the containment vessel 12, thereby unclogging the perforations or openings. The second pressurized liquid flow, i.e., the flow through nozzles 86, is adapted to be directed over a portion of the perimeter with the objective of forcing shrimp eggs outward through the perforations of mesh 22. In a preferred construction, the flow patterns are arranged such that the flows do not overlap.

FIGS. 5, 6, 7 and 8 illustrate a vessel fitted with a brine shrimp harvesting apparatus in association with the separator 10 and a collection assembly 126. The brine shrimp harvester 103, shown positioned on the front of the vessel 90, includes a plurality of upstanding panel members 102 and 104. The pair of upstanding members 102 is shown positioned on either side of the panel 104 to extend vertically along an upstanding edge of that panel 104. Each of the panels 102 is a solid member oriented at an angle to the plane of the panel 104 to form a general U-shaped structure.

Figure 6:
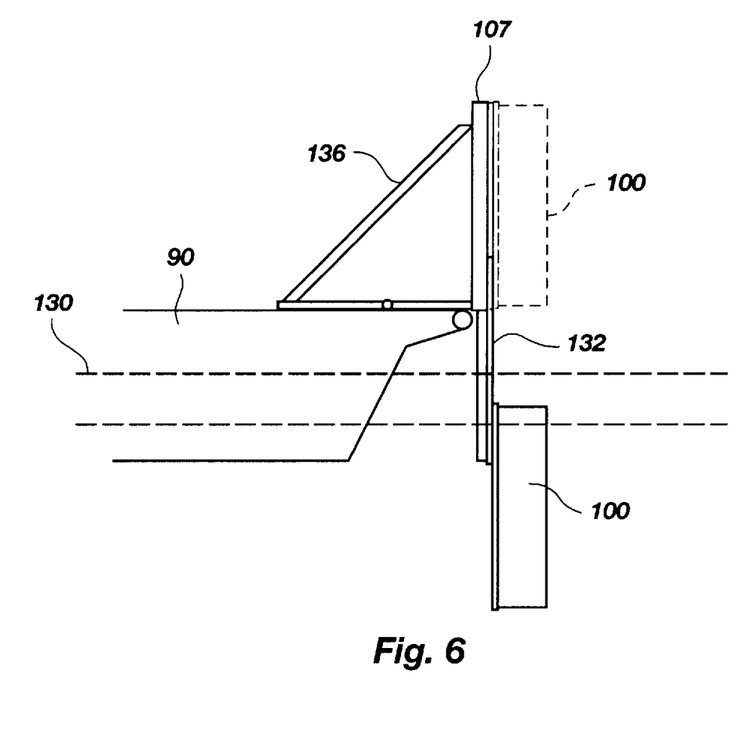
FIG. 6 is a side view of a harvester of the instant invention.
Figure 7:
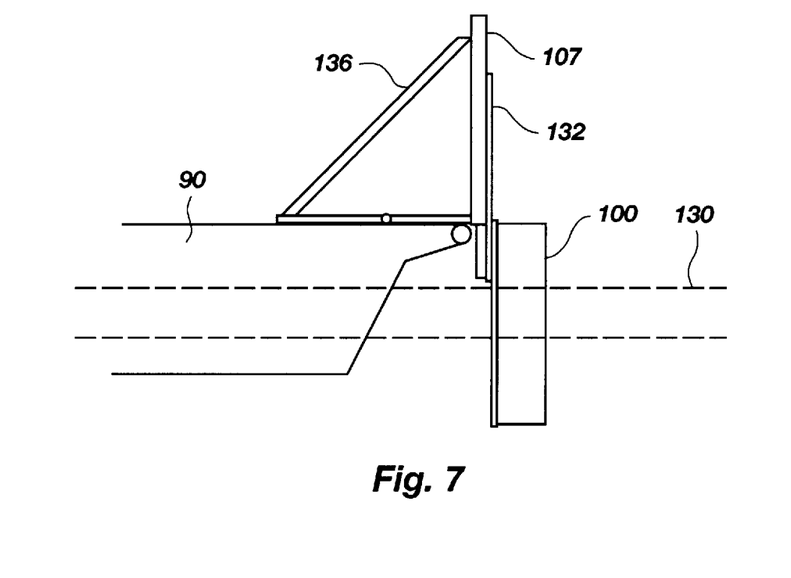
FIG. 7 is a side view of the harvester of FIG. 6 shown in a harvesting configuration.
Figure 8:
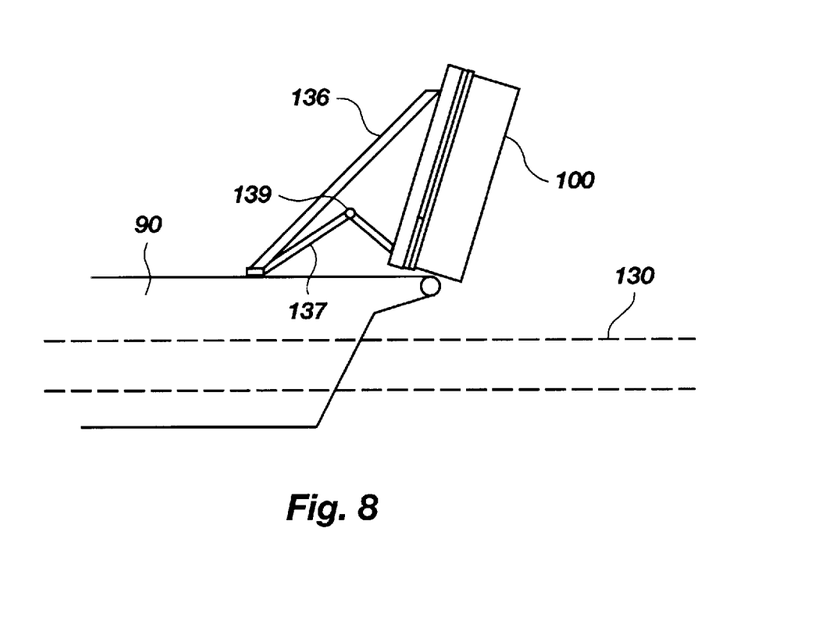
FIG. 8 is a side view of the harvester of FIG. 5 shown in a stored configuration.

The harvester assembly 100 is fitted to a frame assembly 107. As shown in FIGS. 6, 7 and 8, the harvester assembly 100 is positionable at a multiple of vertical orientations with respect to the surface 130 of the body of water in which the vessel is floating. The harvester assembly 100 is mounted to an extension 132 which is slidably received in a channel formed in a frame assembly 107. Due to its mounting, the harvester assembly 100 may be displaced vertically, upwardly or downwardly with the extension 132 sliding within the channel defined within the frame assembly 107. A conventional locking assembly may be utilized to retain the assembly 100 at a preselected elevation relative to frame 107. Depending on the use anticipated for the harvester, the harvester structure 100 may be positioned in a first stored position shown in dotted section in FIG. 6, in a second position shown in FIG. 8 wherein the harvester assembly 100 is stored for purposes of the travel of the boat 90 through the water or, alternatively, in a harvesting orientation as shown either by the solid section of assembly 100 in FIG. 6 or in FIG. 7.

It is furthermore shown in FIGS. 6, 7 and 8, that frame assembly 107 includes an angularly oriented support frame 136 and an articulated support 137 which during the stored configuration of the harvester assembly shown in FIG. 8 is hinged and articulated around the pivot point 139 in order to permit the harvest assembly 100 to be displaced backward onto the deck of the boat 90.

Figure 5:
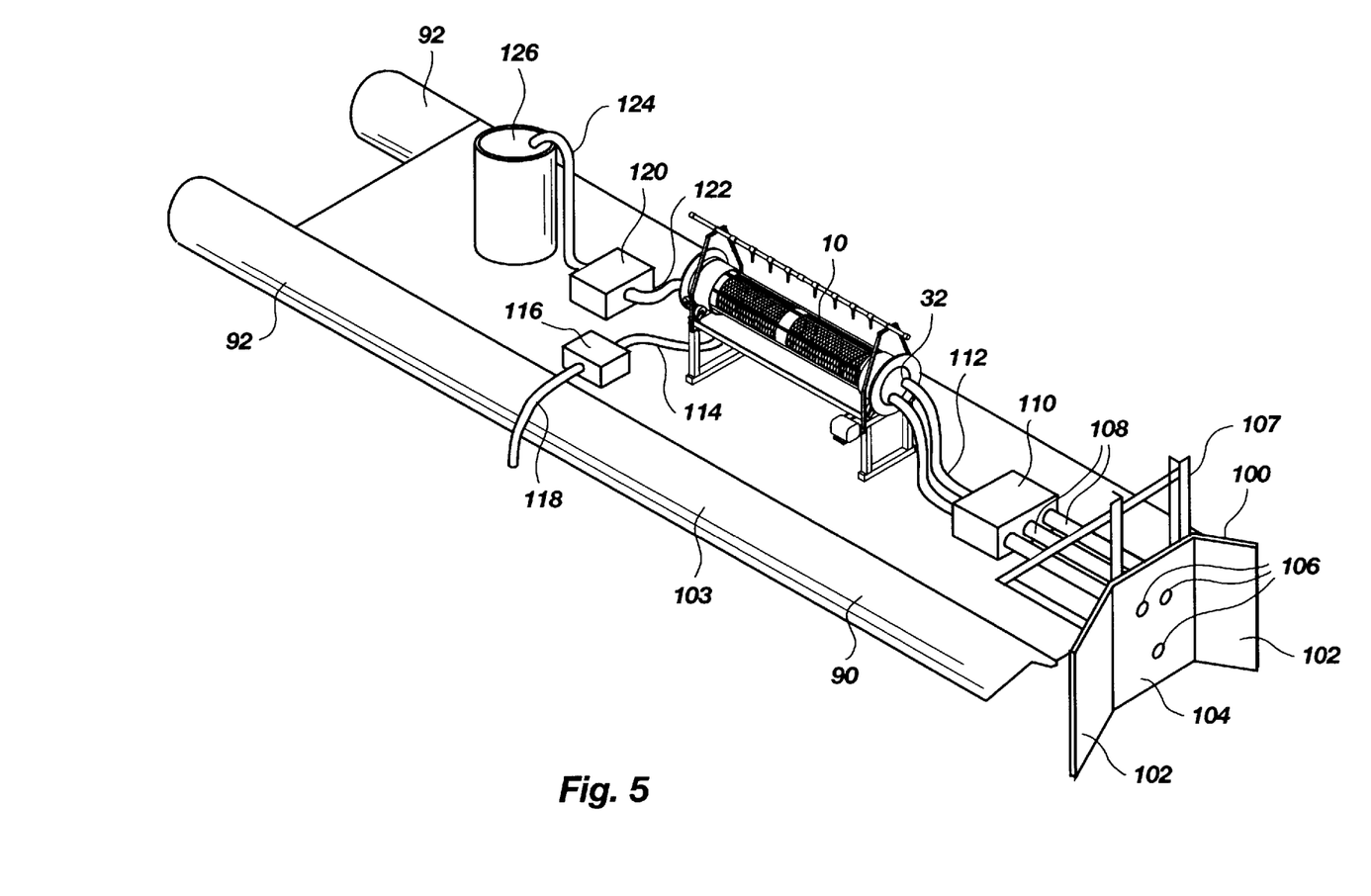
FIG. 5 is a perspective view of a vessel fitted with a brine shrimp harvester in association with a separator and a containment vessel for receiving and retaining separated brine shrimp eggs.

The harvester assembly 100 and, more specifically, panel 104 defines a plurality of apertures 106 therethrough. Each of the apertures 106 is fitted with a respective piping assembly 108 which is sealably connected to the panel 104 to circumscribe the aperture 106.

Each of the piping elements 108 is interconnected to diaphragm pump 110. The pump 110, in turn, is interconnected to a second piping arrangement 112 which is adapted to direct the flow of brine shrimp to the separator structure 10. The pipe arrangement 114 is fitted to the exit port 47 of the trough 42 for purposes of withdrawing shrimp eggs and associated water medium from the trough and thereby directing it through the second pump 120. The pump 120 directs the brine shrimp eggs and water carrying medium through a further pipe 124 into a conventional porous container 126 wherein the eggs are deposited pending their transportation to a further processing site on shore. The containment vessel 126 has preferably perforated sidewalls which permit brine contained within the container to pass through the container sidewalls while retaining the shrimp eggs in the container. The container allows the eggs to be further drained as the water passes through the perforations and is drained outwardly into the lake itself. A second pipe arrangement 114 is interconnected to the interior 30 of the containment vessel 12 for purposes of receiving and removing the shrimp which have been separated from their respective brine shrimp eggs. Pipe 114 is interconnected to a further diaphragm pump 116 which pressurizes the shrimp water slurry and directs that slurry outwardly through a pipe 118 back into the water in which the vessel 90 is floating.

It should recognized that in the present embodiment, the harvester provides a method whereby brine shrimp and associated eggs are retrieved from an aquatic environment along with a quantity of brine salt water by means of a harvester structure. The slurry is then directed, under pressure, to the separator by means of a pump assembly and associated piping. The slurry is deposited in the containment vessel of the separator. The containment vessel is then displaced, e.g., rotated while a first liquid spray is directed over the exterior surface of the vessel and a second liquid spray is directed over the vessel contents from inside the vessel. Shrimp eggs are drawn by gravity and the pressure of the second liquid spray to pass through the perforations or mesh while the shrimp in the slurry are retained in the containment vessel. The first liquid spray operates to dislodge any shrimp which may be lodged within the perforations of the containment vessel sidewall. Shrimp, passing through the containment vessel sidewall are collected, and directed, preferably under pressure, to a collection container. The collection container is preferably perforated to permit the eggs to drain. The shrimp are collected and subsequently directed, preferably under pressure, back into the aquatic environment from which they were retrieved.

It should be recognized that the illustrated embodiments in the instant invention are intended solely to be illustrative of the invention and not to be construed as being limitations. The invention being only limited by the claims which are appended hereto.

What is claimed is:

1. A method of separating shrimp eggs from a slurry formed of shrimp eggs, shrimp and water, said method comprising:

providing a containment vessel having a perforated sidewall;

placing said slurry in said containment vessel; and rotating said containment vessel collecting shrimp eggs which have passed through said perforated sidewall.

2. The method of claim 1, further including the step of directing a first spray of liquid from within said containment vessel over said slurry to drive said shrimp eggs outward toward and through said perforated sidewall of said containment vessel.

3. The method of claim 2, wherein a second spray of liquid is directed over the exterior surface of said containment vessel to dislodge shrimp lodged in said perforations of said containment vessel sidewall.

4. The method of claim 1, further including the step of removing the shrimp from said containment vessel and directing said shrimp back to an aquatic environment from which they were originally retrieved.

5. The method of claim 1, wherein said containment vessel is rotated about an axis.

6. The method of claim 1, wherein said collected shrimp eggs are subsequently deposited in a porous container configured to permit drainage of said water from said shrimp eggs.

7. The method of claim 1, wherein further including the step of harvesting said shrimp from an aquatic environment.

* * * * *